US011931750B1

(12) United States Patent
Urry et al.

(10) Patent No.: US 11,931,750 B1
(45) Date of Patent: Mar. 19, 2024

(54) HOSE NOZZLE

(71) Applicant: Husqvarna AB, Huskvarna (SE)

(72) Inventors: Andrew Mark Urry, Riverton, UT (US); Eric Tres Wangsgaard, Salt Lake City, UT (US)

(73) Assignee: HUSQVARNA AB (SE)

( * ) Notice: Subject to any disclaimer, the term of this patent is extended or adjusted under 35 U.S.C. 154(b) by 321 days.

(21) Appl. No.: 17/220,577

(22) Filed: Apr. 1, 2021

(51) Int. Cl.
*B05B 1/16* (2006.01)

(52) U.S. Cl.
CPC .................................. *B05B 1/1654* (2013.01)

(58) Field of Classification Search
CPC ....... B05B 1/1654; B05B 1/18; B05B 1/1663; B05B 1/185; B05B 1/169; B05B 1/3026; B05B 3/04; E03C 1/0409; E03C 1/10405; E03C 1/0405
See application file for complete search history.

(56) References Cited

U.S. PATENT DOCUMENTS 3,998,390 A * 12/1976 Peterson ............... B05B 1/1654 239/394
4,043,511 A * 8/1977 Nakamura .............. B05B 1/083 239/394
2014/0367482 A1* 12/2014 Cacka .................. B05B 1/1654 4/601

OTHER PUBLICATIONS

Oxygenics; Drench Brushed Nickel 55-Spray Rain Dual Shower Head, Product No. 75688, apparently sold or offered for sale on or before May 7, 2019, images of the whole item and parts thereof are shown in attachment 1, pp. 1-8.

Lowes; Oxygenics Drench Brushed Nickel 55-Spray Rain Dual Shower Head, Product No. 75688, webpage apparently published on or before Jul. 20, 2021; retrieved from the Internet on Jul. 20, 2021 at the URL: https://www.lowes.com/pd/Oxygenics-Drench-Brushed-Nickel-55-Spray-Rain-Dual-Shower-Head/1000853386 pp. 1-10 (shown in attachment 2) (including a review dated May 7, 2019).

* cited by examiner

*Primary Examiner* — Steven M Cernoch
(74) *Attorney, Agent, or Firm* — Austin Rapp

(57) ABSTRACT

A hose nozzle for spraying fluids is disclosed. The hose nozzle comprises a faceplate rotatable about a central pivot axis to two or more user-selectable rotational orientations. The faceplate comprises an upstream sealing surface and two or more entry openings. A seal member defines a seal opening that comprises a portion of a fluid flow pathway within the hose nozzle. The seal member may comprise a downstream sealing surface.

12 Claims, 11 Drawing Sheets

| Legend | |
| --- | --- |
| Surface Area 1224 of Upstream Seal Face 1212 | (hatch pattern) |
| Surface Area 1226 of Upstream Entry Point 1012 | (hatch pattern) |

HOSE NOZZLE

TECHNICAL FIELD

The present invention relates generally to spray nozzles. More specifically, the present invention relates to spray nozzles including user-selectable nozzle patterns.

BACKGROUND

Spray nozzles with user-selectable nozzle patterns are used in a number of different ways, such as for watering lawns or vegetation, or for cleaning a car. For example, these nozzles may be used to spray a hot fluid, such as hot water. In such a case, it is important that the fluid not leak when switching between the user-selectable nozzles. Otherwise, the hot fluid may contact the hand of the user holding the nozzle. Accordingly, an improved nozzle with user-selectable nozzle patterns is desirable.

SUMMARY

Embodiments of the disclosed subject matter are provided below for illustrative purposes and are in no way limiting of the claimed subject matter.

Various embodiments of a hose nozzle for spraying fluids are disclosed. For example, the hose nozzle may comprise a handle, a body, a nozzle head, and a fluid flow pathway extending through the handle, body and nozzle head.

The nozzle head may comprise a faceplate. The faceplate may comprise a central pivot axis and an upstream faceplate face. The upstream faceplate face may comprise an upstream sealing surface and may define two or more entry openings. The faceplate may be rotatable about the central pivot axis to two or more user-selectable rotational orientations. The two or more entry openings may be disposed around the central pivot axis such that an intervening portion of the upstream sealing surface may be disposed intermediate each of the two or more entry openings.

The nozzle head may also comprise a seal member which may define a seal opening that may comprise a portion of the fluid flow pathway. The faceplate may be rotatable to the two or more user-selectable rotational orientations such that the seal opening may be in fluid communication with a selected entry opening and a corresponding user-selectable spray pattern pathway. The corresponding user-selectable spray pattern pathway may comprise a portion of the fluid flow pathway.

The seal member may have an arcuate shape and may comprise a first wing member and a second wing member, each of which extend away from the seal opening. The seal member may have a downstream seal face and an upstream seal face. The downstream seal face may comprise a downstream sealing surface.

The downstream sealing surface may be planar, and the upstream seal face may comprise an outer perimeter wall, a cylinder-shaped protrusion, a first upstream recess and a second upstream recess. The cylinder-shaped protrusion may be disposed around the seal opening, and the outer perimeter wall and the cylinder-shaped protrusion may extend upstream with respect to the downstream seal face. The outer perimeter wall and the cylinder-shaped protrusion may define the first and second upstream recesses. A combination of the outer perimeter wall and the cylinder-shaped protrusion may segregate the first and second recesses into discrete, separate recesses such that the first and second recesses may be noncontiguous.

In various embodiments of the hose nozzle for spraying fluids, the downstream sealing surface may have an interference fit of at least 30/1000th of an inch with the upstream sealing surface.

In various embodiments of the hose nozzle for spraying fluids, the seal member may be devoid of indirect and direct contact with a spring such that no spring may induce movement of the seal member.

In various embodiments of the hose nozzle for spraying fluids, when a fluid is flowing through the fluid flow pathway, the fluid may apply pressure to the upstream seal face to induce the downstream sealing surface of the seal member toward the upstream sealing surface of the faceplate such that a fluid-tight seal may be formed between the downstream sealing surface and the upstream sealing surface to mitigate leakage of the fluid within the fluid flow pathway between the downstream sealing surface and the upstream sealing surface when the hose nozzle is in an operating state.

In various embodiments of the hose nozzle for spraying fluids, a ratio between a surface area of the upstream seal face to the surface area of an upstream entry point of the seal opening may be at least 3.121 to 1.

In various embodiments of the hose nozzle for spraying fluids, the two or more entry openings may comprise the selected entry opening, an adjacent clockwise entry opening situated immediately adjacent to the selected entry opening in a clockwise direction, and an adjacent counterclockwise entry opening situated immediately adjacent to the selected entry opening in a counterclockwise direction. A clockwise intervening portion of the downstream sealing surface may be disposed intermediate the selected entry opening and the adjacent clockwise entry opening, and a counterclockwise intervening portion of the downstream sealing surface may be disposed intermediate the selected entry opening and the adjacent counterclockwise entry opening. The downstream sealing surface of the first wing may engage with at least a portion of the clockwise intervening portion, and the downstream sealing surface of the second wing may engage with at least a portion of the counterclockwise intervening portion.

In various embodiments of the hose nozzle for spraying fluids, the faceplate may comprise an upstream faceplate member that may comprise the two or more entry openings and a downstream faceplate member that may comprise two or more exit openings.

In other embodiments of the hose nozzle for spraying fluids, the hose nozzle may comprise a handle, a body, a nozzle head, and a fluid flow pathway extending through the handle, body and nozzle head.

The nozzle head may comprise a faceplate. The faceplate may comprise a central pivot axis and an upstream faceplate face. The upstream faceplate face may comprise an upstream sealing surface and may define two or more entry openings. The faceplate may be rotatable about the central pivot axis to two or more user-selectable rotational orientations. The two or more entry openings may be disposed around the central pivot axis such that an intervening portion of the upstream sealing surface may be disposed intermediate each of the two or more entry openings.

The nozzle head may also comprise a seal member that may define a seal opening that may comprise a portion of the fluid flow pathway. The faceplate may be rotatable to the two or more user-selectable rotational orientations such that the seal opening may be in fluid communication with a selected entry opening and a corresponding user-selectable spray pattern pathway. The corresponding user-selectable spray pattern pathway may comprise a portion of the fluid flow pathway.

The seal member may have an arcuate shape, and may comprise a first wing member and a second wing member that may extend away from the seal opening. The seal member may have a downstream seal face and an upstream seal face, the downstream seal face may comprise a downstream sealing surface. The seal member may be devoid of indirect and direct contact with a spring such that no spring may induce movement of the seal member. The downstream sealing surface may be planar.

In various embodiments of the hose nozzle for spraying fluids, when a fluid is flowing through the fluid flow pathway, the fluid may apply pressure to the upstream seal face to induce the downstream sealing surface of the seal member toward the upstream sealing surface of the faceplate such that a fluid-tight seal may be formed between the downstream sealing surface and the upstream sealing surface to mitigate leakage of the fluid within the fluid flow pathway between the downstream sealing surface and the upstream sealing surface when the hose nozzle is in an operating state.

In various embodiments of the hose nozzle for spraying fluids, the downstream sealing surface may have an interference fit of at least $^{30}/_{1000}$th of an inch with the upstream sealing surface.

In various embodiments of the hose nozzle for spraying fluids, a ratio between a surface area of the upstream seal face to the surface area of an upstream entry point of the seal opening may be at least 3.121 to 1.

In various embodiments of the hose nozzle for spraying fluids, the two or more entry openings may comprise the selected entry opening, an adjacent clockwise entry opening situated immediately adjacent to the selected entry opening in a clockwise direction, and an adjacent counterclockwise entry opening situated immediately adjacent to the selected entry opening in a counterclockwise direction. A clockwise intervening portion of the downstream sealing surface may be disposed intermediate the selected entry opening and the adjacent clockwise entry opening, and a counterclockwise intervening portion of the downstream sealing surface may be disposed intermediate the selected entry opening and the adjacent counterclockwise entry opening. The downstream sealing surface of the first wing may engage with at least a portion of the clockwise intervening portion, and the downstream sealing surface of the second wing may engage with at least a portion of the counterclockwise intervening portion.

In various embodiments of the hose nozzle for spraying fluids, the faceplate may comprise an upstream faceplate member that may comprise the two or more entry openings, and a downstream faceplate member that may comprise two or more exit openings.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

Figure 1:
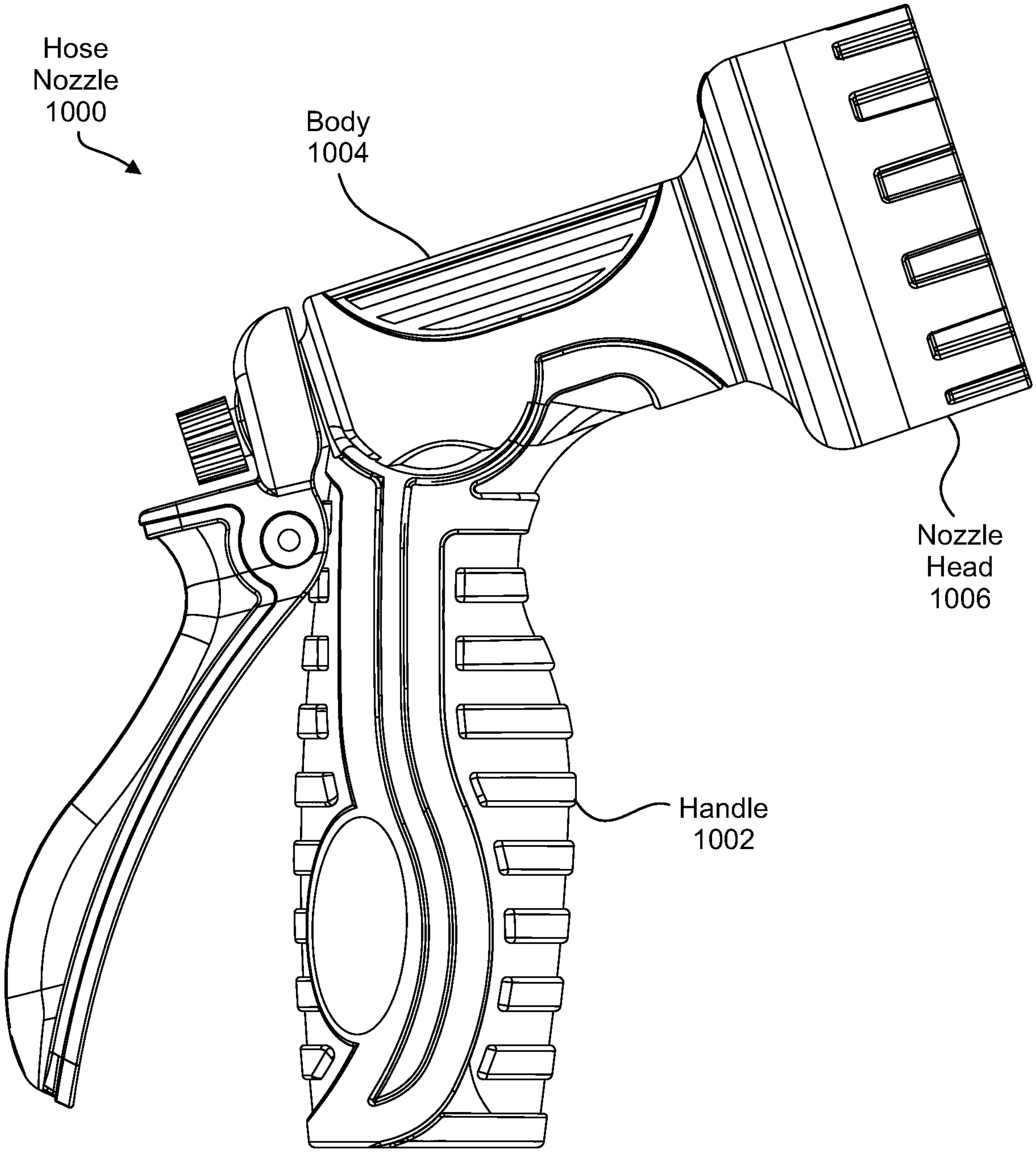
FIG. 1 is a side view of one embodiment of a hose nozzle.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the present disclosure are described below. It should be apparent that the teachings herein may be embodied in a wide variety of forms and that any specific structure, function, or both disclosed herein is merely representative. Based on the teachings herein, one skilled in the art should appreciate that an aspect disclosed herein may be implemented independently of any other aspects and that two or more of these aspects may be combined in various ways, even if that combination is not specifically illustrated in the figures. For example, an apparatus may be implemented, or a method may be practiced, using any number of the aspects set forth herein whether disclosed in connection with a method or an apparatus. Further, the disclosed apparatuses and methods may be practiced using structures or functionality known to one of skill in the art at the time this application was filed, although not specifically disclosed within the application.

By way of introduction, the following brief definitions are provided for various terms used in this application. Additional definitions will be provided in the context of the discussion of the figures herein. As used herein, "exemplary" signifies an example, an implementation, and/or an aspect, and should not be construed as limiting or as indicating a preference or a preferred implementation. Further, it is to be appreciated that certain ordinal terms (e.g., "first" or "second") are provided for identification and ease of reference and do not necessarily imply physical characteristics or ordering. Therefore, as used herein, an ordinal term (e.g., "first," "second," "third") is used to modify an element (such as a structure, a component, an operation, etc.), and does not indicate priority or order of the element with respect to another element, but rather distinguishes the element from another element having a same name (but for use of the ordinal term). In addition, as used herein, indefinite articles ("a" and "an") indicate "one or more" rather than "one." As used herein, a structure or operation that "comprises" or "includes" an element can include one or more other elements not explicitly recited. Thus, the terms "including," "comprising," "having," and variations thereof signify "including but not limited to" unless expressly specified otherwise. Further, an operation performed "based on" a condition or event can also be performed based on one or more other conditions or events not explicitly recited. As used in this application, the terms "an embodiment," "one embodiment," "another embodiment," or analogous language do not refer to a single variation of the disclosed subject matter; instead, this language refers to variations of the disclosed subject matter that can be applied and used with a number of different implementations of the disclosed subject matter. An enumerated listing of items does not imply that any or all of the items are mutually exclusive and/or mutually inclusive, unless expressly specified otherwise.

For this application, the phrases "secured to," "connected to," "coupled to," and "in communication with" refer to any form of interaction between two or more entities, including mechanical, electrical, magnetic, electromagnetic, and thermal interaction and may also include integral formation fluid communication. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanisms. The term "abut" refers to items that are in direct physical contact with each other, although the items may be attached, secured, fused, or welded together. The term "integrally formed" refers to a body that is manufactured integrally, i.e., as a single piece, without requiring the assembly of multiple pieces. Multiple parts may be integrally formed with each other if they are formed from a single workpiece.

The phrase "substantially coaxially aligned," as used herein, signifies that the pertinent members, components, or items that are "substantially coaxially aligned" with each other are within 15° of being perfectly coaxially aligned with each other. Thus, the term "substantially coaxially aligned" signifies that two items are aligned such that they share a common, imaginary axis (or within 150 of sharing the same common, imaginary axis) extending through both of the items, although the items may be spaced apart along that common, imaginary axis.

The phrase "coaxially aligned," as used herein, signifies that the pertinent members, components, or items that are "coaxially aligned" with each other are within 3° of being perfectly coaxially aligned with each other. Thus, the term "coaxially aligned" signifies that two items are aligned such that they share a common, imaginary axis (or within 3° of sharing the same common, imaginary axis) extending through both of the items, although the items may be spaced apart along that common, imaginary axis.

In various embodiments, the term "offset and substantially coaxially aligned" signifies that two items are aligned such that they share a common, imaginary axis (or within 150 of sharing the same common, imaginary axis) extending through both of the items and the items are spaced apart along the common, imaginary axis. In various embodiments, "overlapping and substantially coaxially aligned" signifies that two items are aligned such that they share a common, imaginary axis (or within 150 of sharing the same common, imaginary axis) extending through both of the items and the items overlap along the common, imaginary axis. In various embodiments, "coextensive and substantially coaxially aligned" signifies that two items are aligned such that they share a common, imaginary axis (or within 150 of sharing the same common, imaginary axis) extending through both of the items and the items are coextensive along the common, imaginary axis.

In various embodiments, the term "offset and coaxially aligned" signifies that two items are aligned such that they share a common, imaginary axis (or within 3° of sharing the same common, imaginary axis) extending through both of the items and the items are spaced apart along the common, imaginary axis. In various embodiments, "overlapping and coaxially aligned" signifies that two items are aligned such that they share a common, imaginary axis (or within 3° of sharing the same common, imaginary axis) extending through both of the items and the items overlap along the common, imaginary axis. In various embodiments, "coextensive and substantially coaxially aligned" signifies that two items are aligned such that they share a common, imaginary axis (or within 3° of sharing the same common, imaginary axis) extending through both of the items and the items are coextensive along the common, imaginary axis.

The phrase "substantially parallel," as used herein, signifies that the pertinent members, components, or items that are "substantially parallel" to each other are within 150 of being perfectly parallel to each other. In contrast, the phrase "parallel," as used herein, signifies that the pertinent members, components, or items that are "parallel" to each other are within 3° of being perfectly parallel to each other.

As used herein, the term "center point nonalignment" when used to identify a relative position of items, features or components along a designated axis signifies that the center points of each of the two identified items are not aligned along the designated axis. In alternative embodiments, the term "outer boundary nonalignment" may be used to signify that the outer boundaries of two items do not overlap along a designated axis. The term "nonaligned positions" indicates that two items are not aligned along at least one axis and may refer, for example, to either center point nonalignment or outer boundary nonalignment.

As used herein, the term "generally" indicates that a particular item is within 15° of a specified orientation or value. As used herein, the term "substantially" indicates that a particular value is within 15% of a specified value.

In the figures, certain components may appear many times within a particular drawing. However, only certain instances of the component may be identified in the figures to avoid unnecessary repetition of reference numbers and lead lines. According to the context provided in the description while referring to the figures, reference may be made to a specific one of that particular component or multiple instances, even if the specifically referenced instance or instances of the component are not identified by a reference number and lead line in the figures.

In the figures, certain components may appear many times within a particular drawing. However, only certain instances of the component may be identified in the figures to avoid unnecessary repetition of reference numbers and lead lines. According to the context provided in the description while referring to the figures, reference may be made to a specific one of that particular component or multiple instances, even if the specifically referenced instance or instances of the component are not identified by a reference number and lead line in the figures.

FIG. 1

FIG. 1 is a side view of one embodiment of a hose nozzle 1000. The hose nozzle 1000 may comprise a handle 1002, a body 1004, and a nozzle head 1006. The hose nozzle 1000 illustrated in FIG. 1, as noted above, comprises only one embodiment of the type of hose nozzle that may incorporate various aspects of the subject matter disclosed herein. For example, different surface ornamentation may be applied to the hose nozzle 1000. As alternative embodiments, the hose nozzle may comprise a rear or front trigger or could comprise other mechanisms for controlling flow, such as a thumb controller operable by a thumb of the user. Alternatively, as an additional example, a handle, body, and nozzle head may be coaxial (or the body could be omitted from the design). Again, the hose nozzle 1000 of FIG. 1 illustrates only one embodiment of a hose nozzle that may incorporate the subject matter disclosed herein.

Figures 2A, 2B:
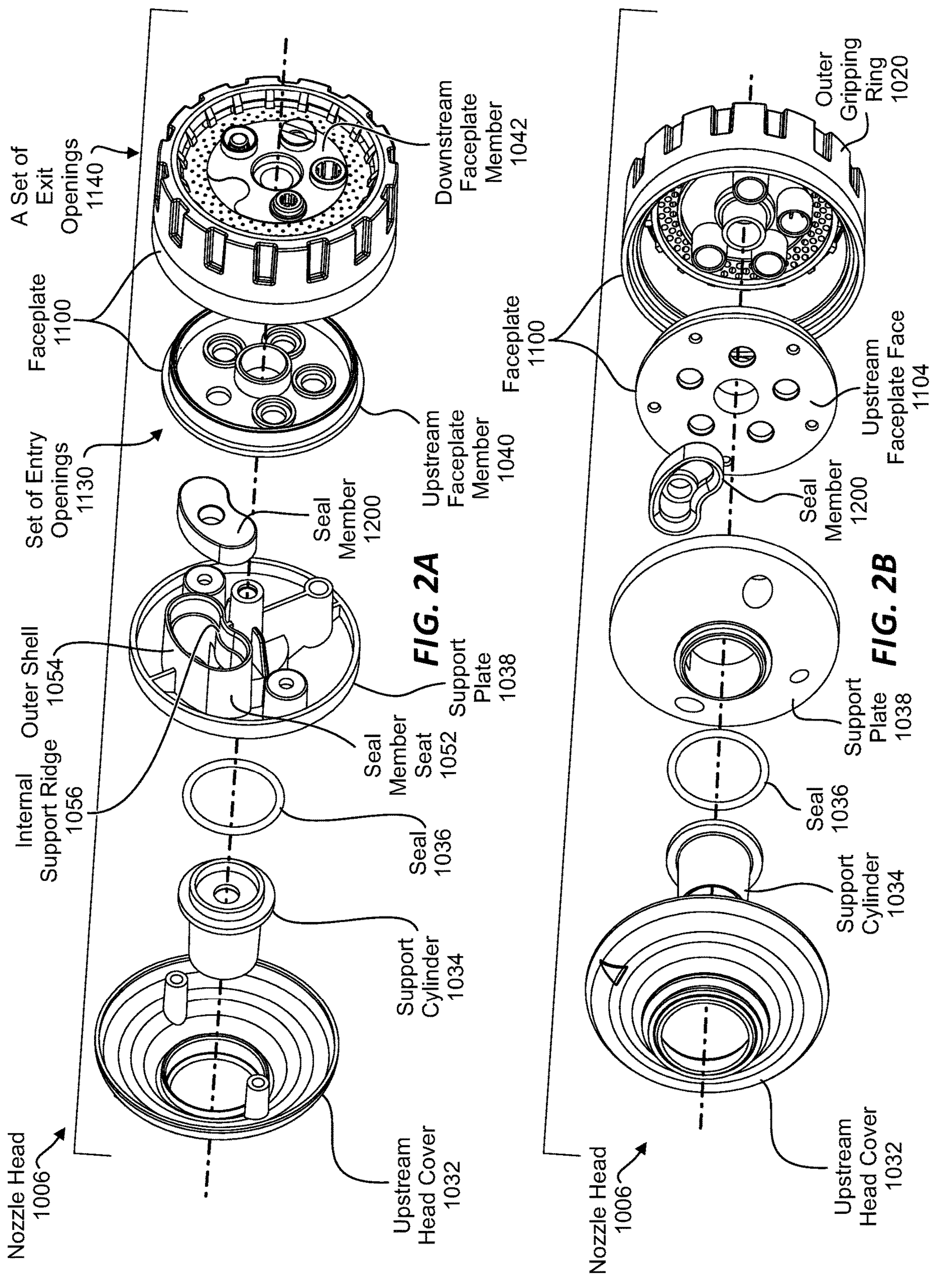
FIGS. 2A-2C comprise exploded views of a nozzle head of the hose nozzle of FIG. 1.
Figure 2C:
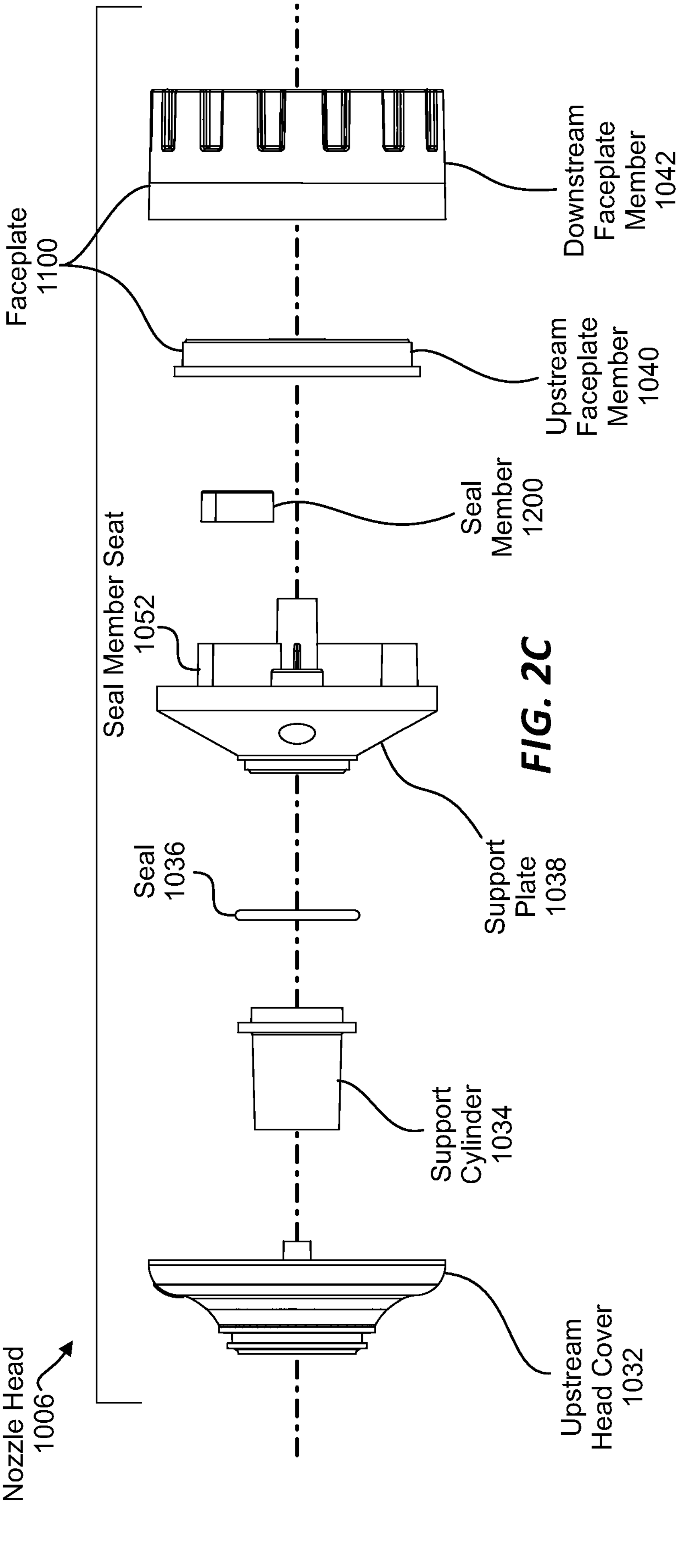

FIGS. 2A-2C comprise exploded views of the nozzle head 1006 of the hose nozzle 1000 of FIG. 1. As illustrated in FIGS. 2A-2C, the nozzle head 1006 may comprise an upstream head cover 1032, a support cylinder 1034, a seal 1036, a support plate 1038, a seal member 1200, and a faceplate 1100. The faceplate 1100, in various embodiments, may comprise an upstream faceplate member 1040 and a downstream faceplate member 1042. The upstream faceplate member 1040 may comprise an upstream faceplate face 1104.

The upstream head cover 1032, support cylinder 1034, seal 1036, and support plate 1038 may interface with one another and be secured to the body 1004, for example, through interference fit engagement, snap-fit engagement, adhesives, ultrasonic welding, spin welding, various fasteners (such as screws or rivets), and/or may be integrally formed. The upstream head cover 1032, support cylinder 1034, seal 1036, support plate 1038 and seal member 1200 may be non-rotationally engaged with the body 1004. The faceplate 1100 may rotationally engage with the support plate 1038.

The support plate 1038 may include a seal member seat 1052 for receiving the seal member 1200. The seal member seat 1052 may comprise an internal support ridge 1056 and an outer shell 1054. The internal support ridge 1056 may engage and limit movement of the seal member 1200 when disposed within the outer shell 1054.

The seal 1036 may comprise, for example, an O-ring seal or other annular seal. The seal 1036 may be utilized to form a fluid-tight engagement between the support cylinder 1034 and the support plate 1038 such that fluid may pass through a fluid flow pathway defined, in part, by the nozzle head 1006.

As noted above, the faceplate 1100 may comprise an upstream faceplate member 1040 and a downstream faceplate member 1042. The faceplate 1100 rotatably engages with respect to the support plate 1038, and thus is rotatable with respect to the support plate 1038, upstream head cover 1032, support cylinder 1034, seal 1036, support plate 1038, seal member 1200 and the remaining components of the hose nozzle 1000. The upstream faceplate member 1040 may comprise a set of entry openings 1130, and the downstream faceplate member 1042 may comprise a set of exit openings 1140. Each entry opening of the set of entry openings 1130 is in fluid communication with one exit opening of the set of exit openings 1140 when the upstream faceplate member 1040 is engaged with the downstream faceplate member 1042. The downstream faceplate member 1042 may also comprise an outer gripping ring 1020 that enables a user to more easily grip and rotate the faceplate 1100

As illustrated in FIGS. 2A-2C, the seal member 1200 is devoid of indirect and direct contact with a spring such that no spring induces movement of the seal member 1200.

Various components illustrated in the nozzle head 1006 and, more broadly, in hose nozzle 1000 may be separately or integrally formed. For example, the faceplate 1100 rather than comprising two or more separate components 1040, 1042, may comprise a single, integrally formed component. Alternatively, the faceplate 1100 may comprise more than two components, as illustrated in FIGS. 2A-2C.

FIGS. 3-4

Figure 3:
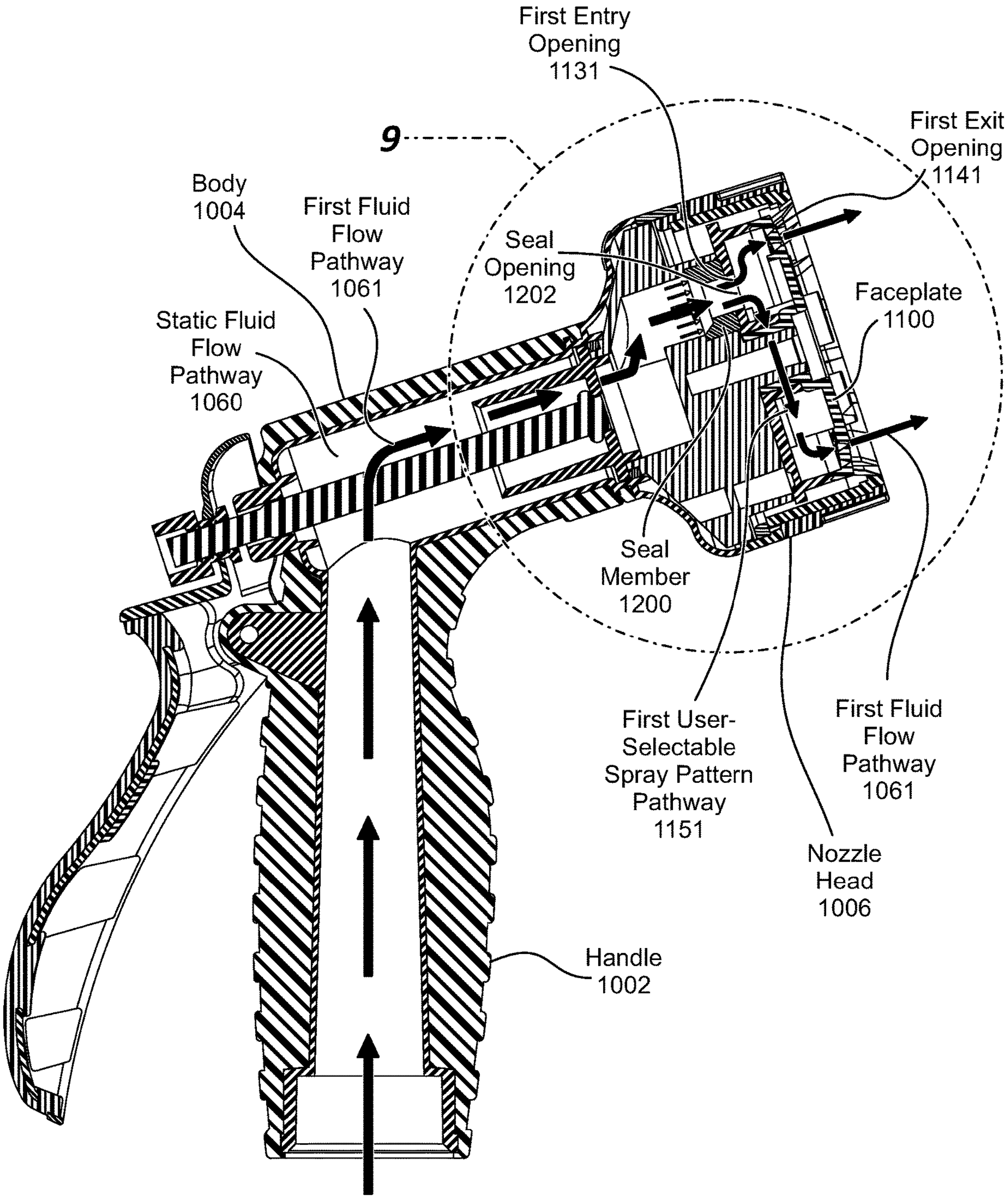
FIGS. 3-4 comprise cross-sectional views of the hose nozzle of FIG. 1.
Figure 4:
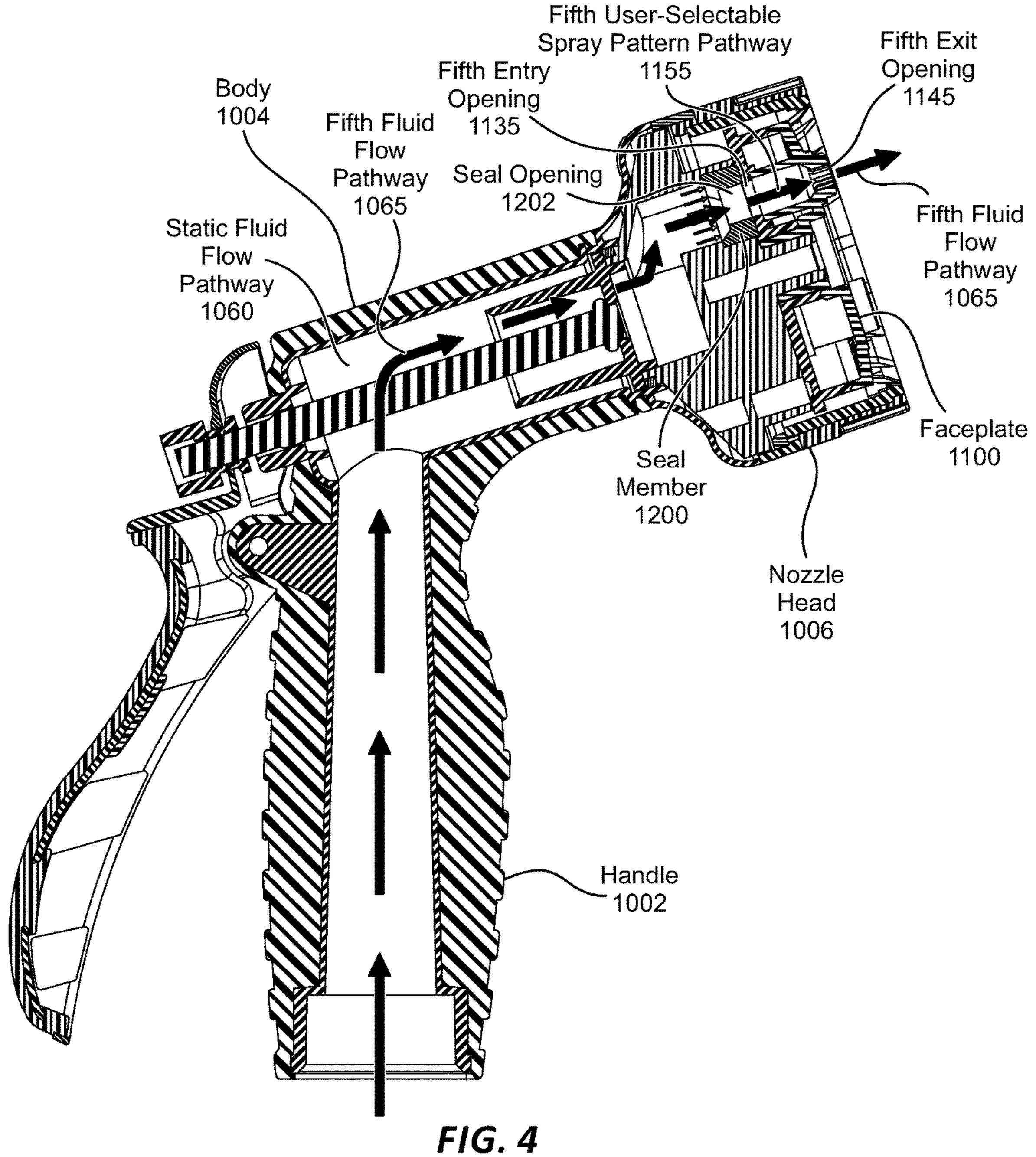

FIGS. 3-4 comprise cross-sectional views of the hose nozzle 1000 of FIG. 1. More specifically, FIGS. 3-4 illustrate a first and a fifth fluid flow pathway 1061, 1065 through the hose nozzle 1000. The first fluid flow pathway 1061 comprises the static fluid flow pathway 1060 and a first user-selectable spray pattern pathway 1151. The static fluid flow pathway 1060 extends through the handle 1002, body 1004, and a portion of the nozzle head 1006. The first user-selectable spray pattern pathway 1151 is disposed within and extends through the faceplate 1100. The fifth fluid flow pathway 1065 comprises the static fluid flow pathway 1060 and the fifth user-selectable spray pattern pathway 1155. The static fluid flow pathway 1060 comprises a portion of the fluid flow pathway through which fluid always flows, irrespective of the rotational orientation of the faceplate 1100.

By altering a rotational orientation of the faceplate 1100, one of the user-selectable spray pattern pathways (e.g., the first user-selectable spray pattern pathway 1151 or the fifth user-selectable spray pattern pathway 1155) may be selected and thereby selecting a corresponding exit opening (e.g., a first exit opening 1141 or a fifth exit opening 1145). Thus, the first fluid flow pathway 1061 is defined, at least in part, by the first exit opening 1141, as illustrated in FIG. 3, while the fifth fluid flow pathway 1065 is defined, at least in part, by the fifth exit opening 1145, as illustrated in FIG. 4. Thus, FIGS. 3-4 illustrate the faceplate 1100 at different user-selectable rotational orientations. In particular, in FIG. 3, the seal opening 1202 of the seal member 1200 is in fluid communication with the first exit opening 1141 (i.e., the static fluid flow pathway 1060 is in fluid communication with the first user-selectable spray pattern pathway 1151), and, in FIG. 4, the seal opening 1202 of the seal member 1200 is in fluid communication with the fifth exit opening 1145 (i.e., the static fluid flow pathway 1060 is in fluid communication with the fifth user-selectable spray pattern pathway 1155). Thus, as illustrated in FIGS. 3-4, both the first fluid flow pathway 1061 and the fifth fluid flow pathway 1065 extend through the handle 1002, body 1004, and nozzle head 1006.

As indicated above, the faceplate 1100 comprises a series of user-selectable spray pattern pathways. Each user-selectable spray pattern pathway comprises, when selected, a portion of a fluid flow pathway. For example, a first user-selectable spray pattern pathway 1151 extends between the first entry opening 1131 and the first exit opening 1141 and comprises a portion of the first fluid flow pathway 1061, as illustrated in FIG. 3. A fifth user-selectable spray pattern pathway 1155 extends between the fifth entry opening 1135 and the fifth exit opening 1145 and comprises a portion of the fifth fluid flow pathway 1065, as illustrated in FIG. 4. Thus, by rotating the faceplate 1100 to a desired rotational orientation, a user may specify a desired exit opening.

FIGS. 5-6

Figure 5:
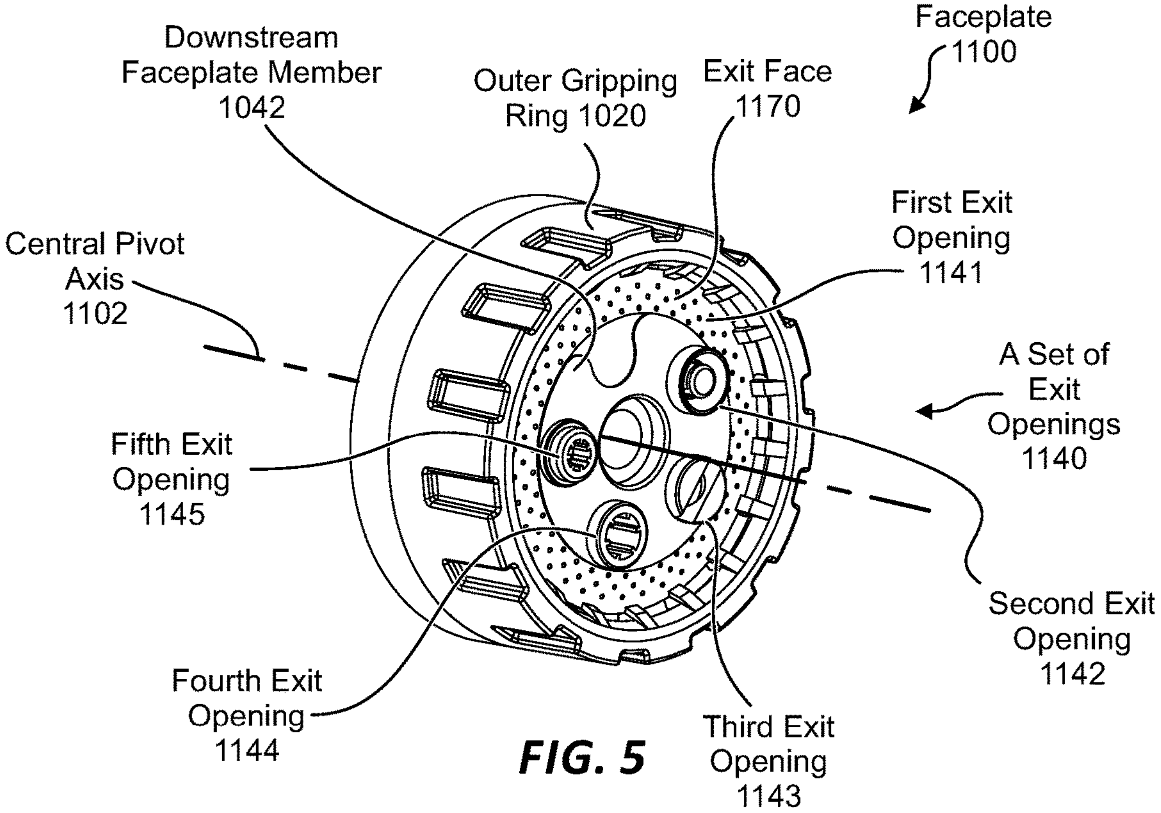
FIGS. 5-6 comprise perspective views of a faceplate of the hose nozzle of FIG. 1.
Figure 6:
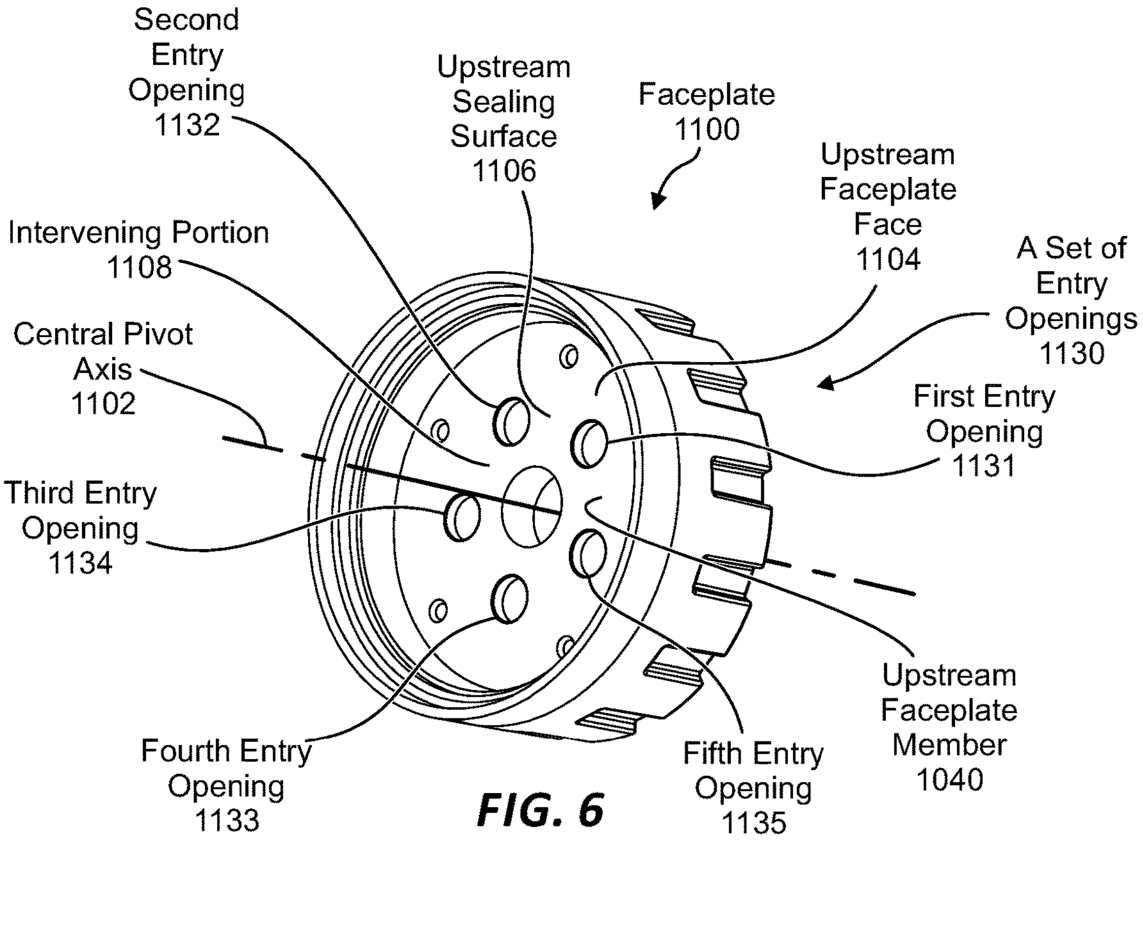

FIGS. 5-6 comprise perspective views of a faceplate 1100 of the hose nozzle of FIG. 1. As illustrated in FIGS. 5-6, the faceplate 1100 is rotatable about a central pivot axis 1102. As indicated previously, the faceplate 1100 may optionally comprise an upstream faceplate member 1040 and a downstream faceplate member 1042.

The upstream faceplate member 1040 may comprise an upstream faceplate face 1104 having an upstream sealing surface 1106 with a set of entry openings 1130 disposed therein. An intervening portion 1108 of the upstream sealing surface 1106 is disposed intermediate each entry opening 1131, 1132, 1133, 1134, 1135 in the set of entry openings 1130.

The downstream faceplate member 1042 may comprise an outer gripping ring 1020 that facilitates gripping and rotation of the faceplate 1100. The downstream faceplate member 1042 may also comprise a set of exit openings 1140. In the illustrated embodiment, the first entry opening 1131 is in fluid communication with the first exit opening 1141, the second entry opening 1132 is in fluid communication with the second exit opening 1142, the third entry opening 1133 is in fluid communication with the third exit opening 1143, the fourth entry opening 1134 is in fluid communication with the fourth exit opening 1144, and the fifth entry opening 1135 is in fluid communication with the fifth exit opening 1145. Each exit opening of the set of exit openings 1140 may comprise more than one opening. For example, the first exit opening 1141 may comprise a series of openings around a perimeter of an exit face 1170 of the faceplate 1100.

It should also be noted that the number of entry openings and the number of exit openings shown in the hose nozzle 1000 are merely illustrative. For example, the hose nozzle 1000 could include more or fewer entry openings and exit openings than those illustrated in the figures.

FIGS. 7A-7D

Figure 7A:
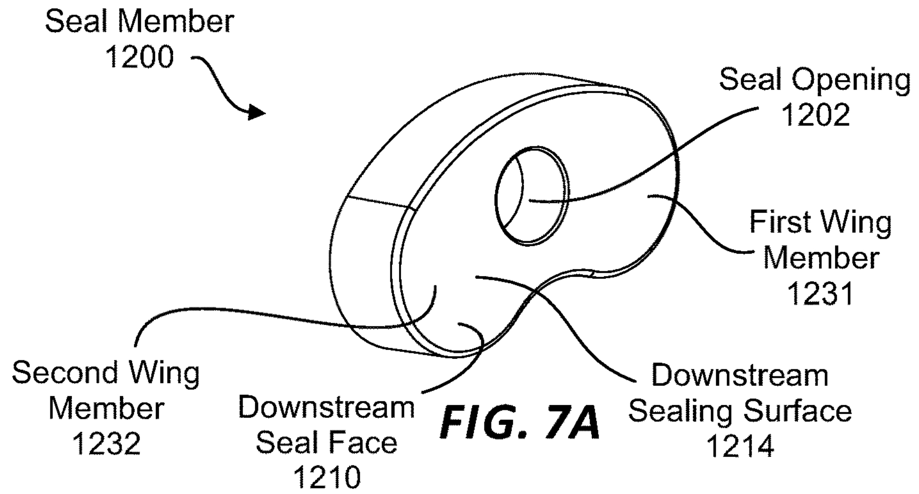
FIGS. 7A-7C comprise perspective views of a seal member of the hose nozzle of FIG. 1.
Figure 7B:
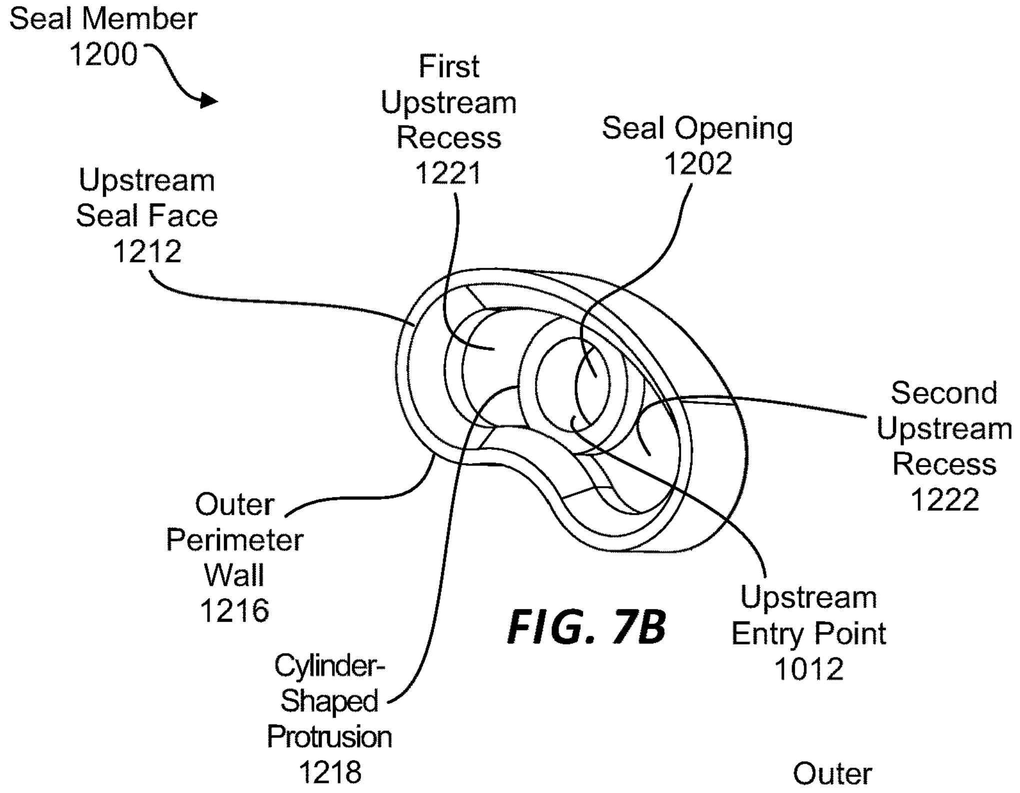
Figure 7C:
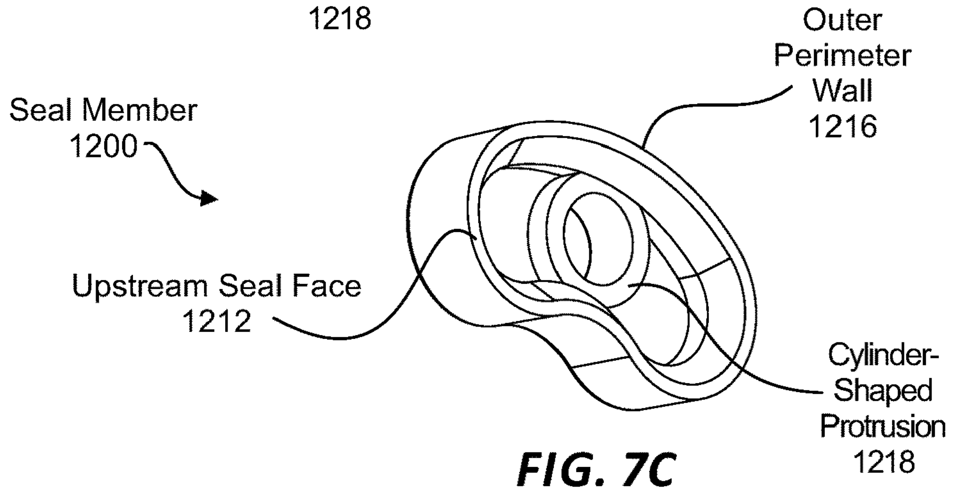
Figure 7D:
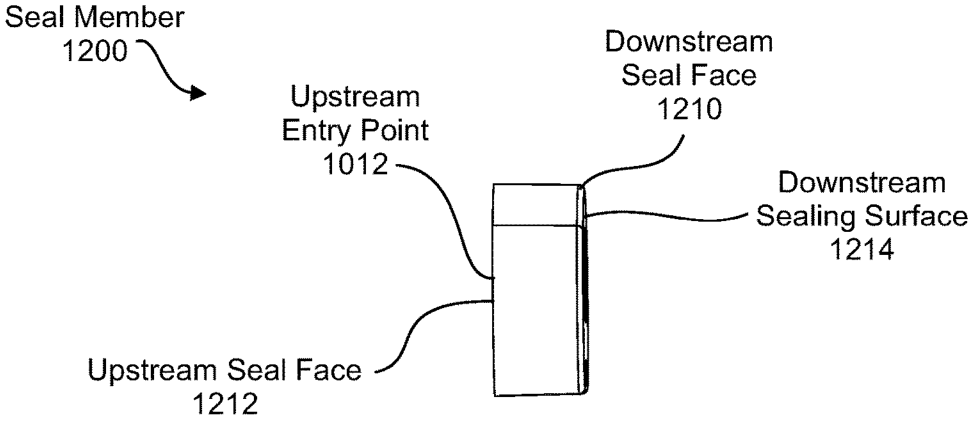
FIG. 7D comprises a side view of the seal member of the hose nozzle of FIG. 1.

FIGS. 7A-7C comprise perspective views of a seal member 1200 of the hose nozzle 1000 of FIG. 1, while FIG. 7D comprises a side view of the seal member 1200 of the hose nozzle 1000 of FIG. 1. As illustrated in these figures, the seal member 1200 may have an arcuate or kidney shape having a first wing member 1231 and a second wing member 1232. A seal opening 1202 is defined by the seal member 1200. The seal opening 1202 may be disposed centrally within the seal member 1200 with the first and second wing members 1231, 1232 extending away from the seal opening 1202. The seal opening 1202 comprises a portion of the fluid flow pathways 1061, 1065. The seal opening 1202 comprises an upstream entry point 1012, which will be discussed in more detail in connection with FIG. 7E.

The seal member 1200 may comprise a downstream seal face 1210 having a downstream sealing surface 1214. The downstream sealing surface 1214 may be planar and may engage with the upstream sealing surface 1106 and one or more of the intervening portions 1108 intermediate the set of entry openings 1130 of the upstream faceplate member 1040 (shown in FIG. 6).

The seal member 1200 may further comprise an upstream seal face 1212. The upstream seal face 1212 may comprise an outer perimeter wall 1216 and a cylinder-shaped protrusion 1218. The cylinder-shaped protrusion 1218 extends upstream with respect to the downstream seal face 1210. The cylinder-shaped protrusion 1218 defines a portion of the fluid flow pathway 1061, 1065. The outer perimeter wall 1216 and cylinder-shaped protrusion 1218 define first and second upstream recesses 1221, 1222. The first and second upstream recesses 1221, 1222 are separate and discrete from one another and are noncontiguous, i.e., the first and second upstream recesses 1221, 1222 are segregated by a combination of the cylinder-shaped protrusion 1218 and the outer perimeter wall 1216.

The seal member 1200 may be made of rubber or other material capable of forming a fluid-tight seal with the upstream sealing surface 1106 of the faceplate 1100. In one embodiment, the seal member 1200 is formed of a resilient material having, for example, a Shore A Durometer of 70±5.

FIG. 7E

Figure 7E:
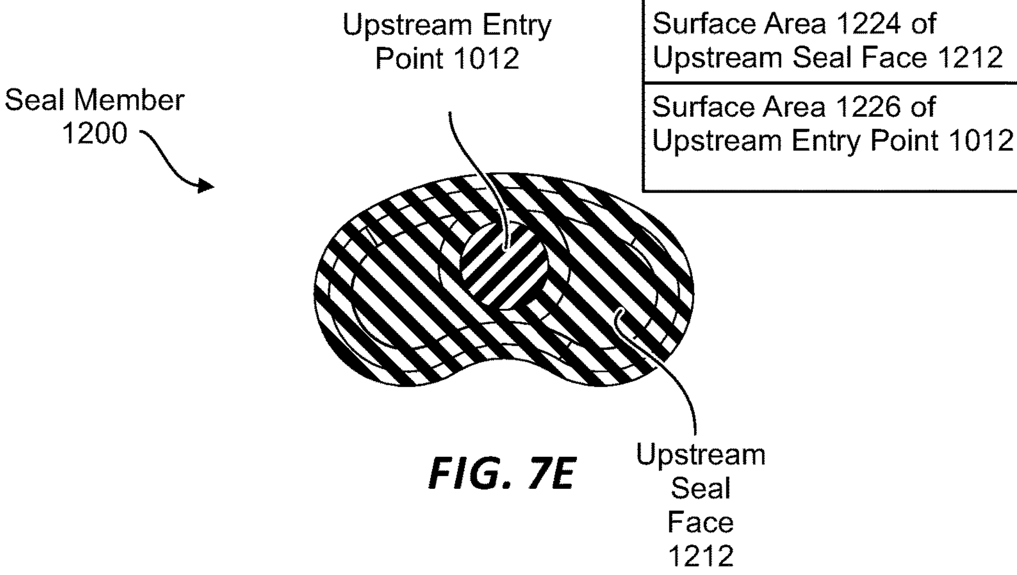
FIG. 7E comprises a plan view of the upstream seal face of the seal member of the hose nozzle of FIG. 1.

FIG. 7E comprises a plan view of the upstream seal face 1212 of the seal member 1200. FIG. 7E further illustrates a surface area 1224 of the upstream seal face 1212 and a surface area 1226 of the upstream entry point 1012. The surface of the upstream entry point 1012 is planar, while the surface of the upstream seal face 1212 involves many contours, which are illustrated in FIGS. 7A-7D. Thus, the computation of the surface area 1224 of the upstream seal face 1212 will be more complex than the computation of the surface area 1226 of the upstream entry point 1012.

As noted previously, no spring is coupled directly or indirectly with the seal member 1200 to induce movement of the seal member 1200 in any direction. Thus, the downstream sealing surface 1214 of the seal member 1200 forms a fluid-tight seal with the upstream sealing surface 1106 of the faceplate 1100, at least in part, as a result of a force applied by the fluid pressure exerted on the upstream seal face 1212 during operation of the hose nozzle 1000, i.e., when pressurized fluid is flowing through or disposed within the hose nozzle 1000. Thus, no spring is needed to urge the seal member 1200 toward the faceplate 1100 to achieve a fluid-tight seal between the downstream sealing surface 1214 and the upstream sealing surface 1106 during operation of the hose nozzle 1000.

As a consequence, in various embodiments, the surface area 1224 of the upstream seal face 1212 is sufficient to induce the seal member 1200 toward the faceplate 1100 when influenced by pressurized fluid disposed within the hose nozzle 1000, as will be explained in additional detail in connection with FIG. 9. In various embodiments, a ratio of a surface area 1224 of the upstream seal face 1212 to a surface area 1226 of the upstream entry point 1012 of the seal opening 1202 is at least 3.121 to 1.

FIG. 8

Figure 8:
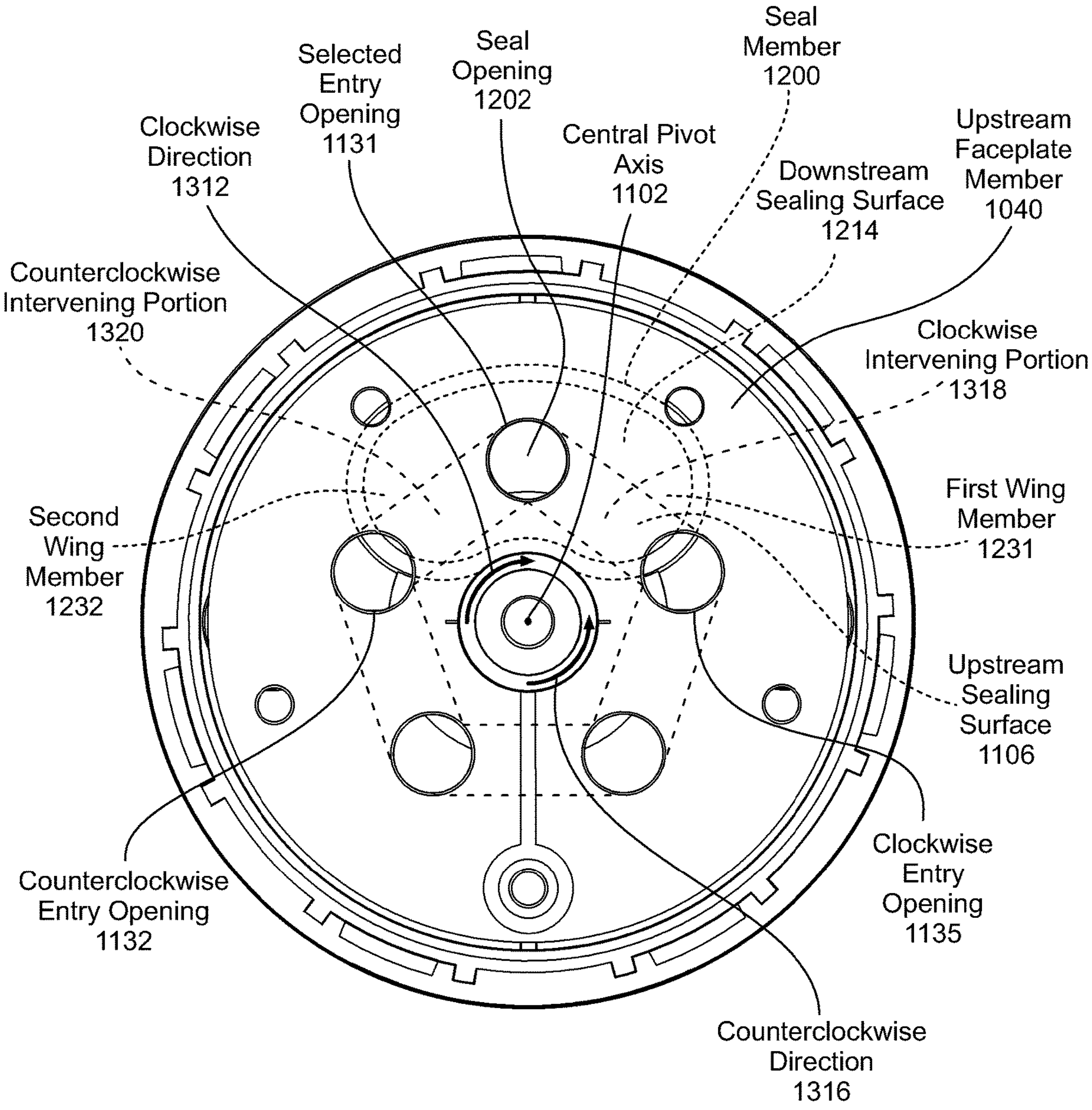
FIG. 8 is a front view of the nozzle head of the hose nozzle of FIG. 1 with the downstream faceplate member omitted and the seal member shown partially in phantom lines.

FIG. 8 is a front view of the nozzle head 1006 of the hose nozzle 1000 of FIG. 1 with the downstream faceplate member 1042 omitted and the seal member 1200 shown in partially phantom lines. For simplicity, the remainder of the hose nozzle 1000, beside the nozzle head 1006, is omitted from FIG. 8. In FIG. 8, the faceplate 1100 (i.e., the upstream faceplate member 1040) is in a particular rotational orientation such that a selected entry opening 1131 (i.e., a first entry opening 1131) is in fluid communication with the seal opening 1202 of the seal member 1200.

The upstream sealing surface 1106 comprises a plurality of intervening portions intermediate each of the entry openings. For example, a clockwise intervening portion 1318 (in a clockwise direction 1312 with respect to the selected entry opening 1131) is disposed intermediate the selected entry opening 1131 and the clockwise entry opening 1135 (i.e., a fifth entry opening 1135), while a counterclockwise intervening portion 1320 (in a counterclockwise direction 1316 with respect to the selected entry opening 1131) is disposed intermediate the selected entry opening 1131 and the counterclockwise entry opening 1132 (i.e., a second entry opening 1132).

In the illustrated rotational orientation, a downstream sealing surface 1214 of the first wing member 1231 engages with and forms a fluid-tight seal with at least a portion of the clockwise intervening portion 1318, while the downstream sealing surface 1214 of the second wing member 1232 engages with and forms a fluid-tight seal with at least a portion of the counterclockwise intervening portion 1320. As further illustrated in FIG. 8, the downstream sealing surface 1214 engages with and forms a fluid-tight seal with the upstream sealing surface 1106 surrounding the selected entry opening 1131.

As indicated previously, the faceplate 1100 may be rotated in a counterclockwise direction 1316 or a clockwise direction 1312 about the central pivot axis 1102 to and through various rotational orientations. If a hot fluid is disposed within or passing through the hose nozzle 1000, this fluid-tight seal between the downstream sealing surface 1214 and the upstream sealing surface 1106 positioned in or transitioning through the various rotational orientations, mitigates the risk or prevents hot water from leaking from the nozzle and contacting a user (e.g., a user's hand or foot) as the faceplate 1100 is positioned in or transitions between various rotational orientations.

FIG. 9

Figure 9:
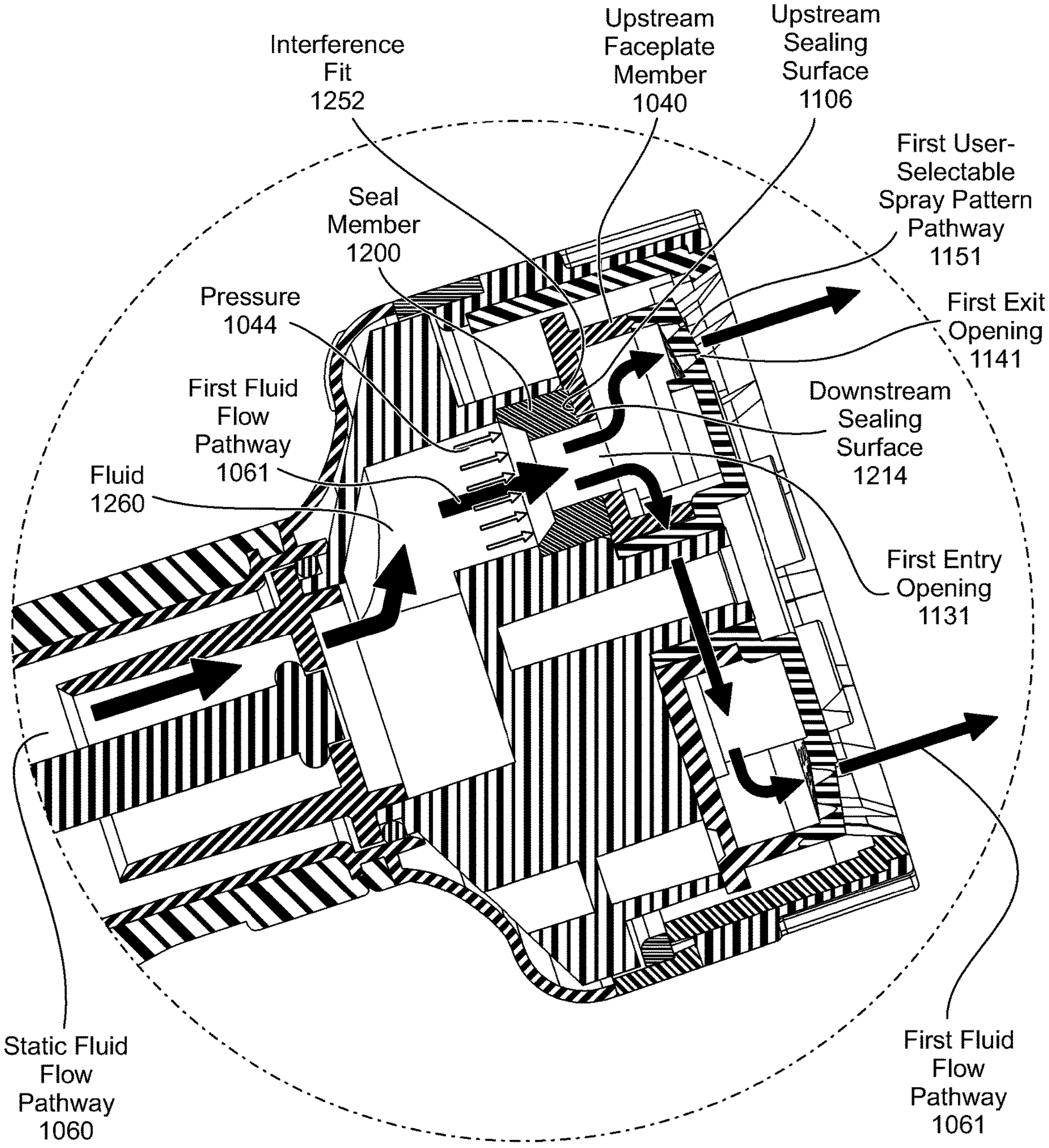
FIG. 9 is an enlarged cross-sectional view of a portion of the hose nozzle of FIG. 1, namely, of area 9 shown in FIG. 3.
Figure 10A:
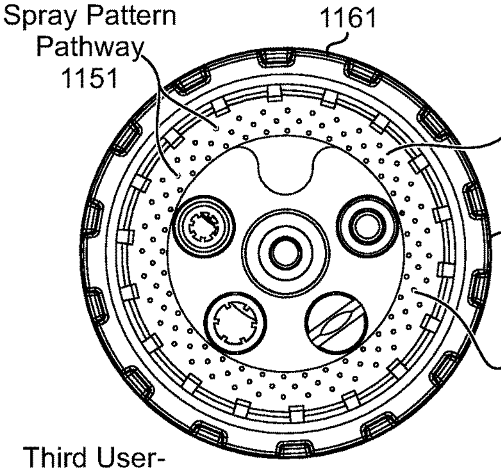
FIGS. 10A-10E comprise front views of the head of the hose nozzle with the faceplate positioned in different user-selectable rotational orientations.
Figure 10B:
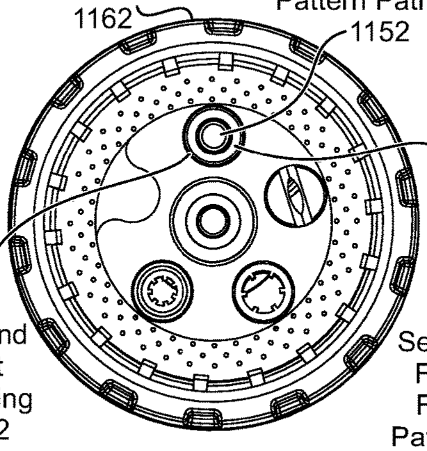
Figure 10C:
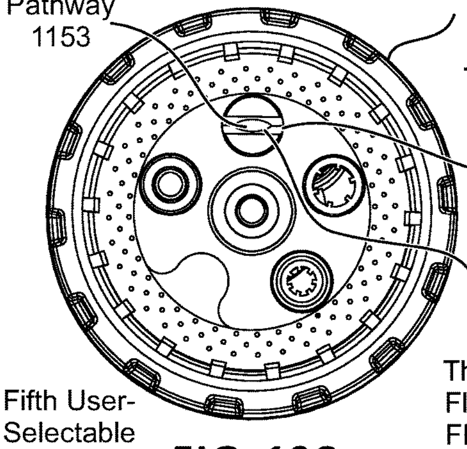
Figure 10D:
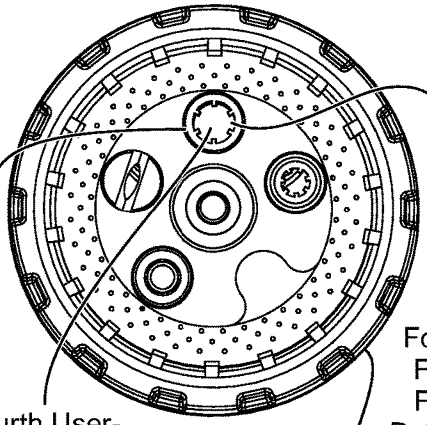
Figure 10E:
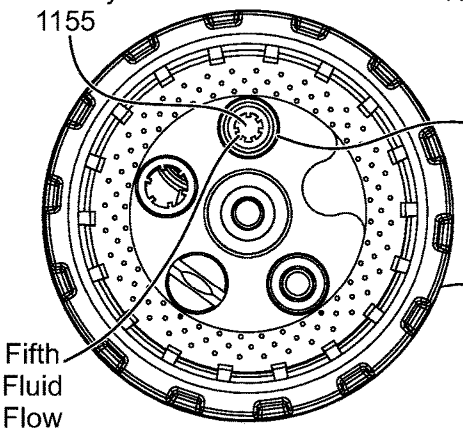

FIG. 9 is a cross-sectional view of a portion of the hose nozzle 1000 of FIG. 1. More specifically, FIG. 9 illustrates a pressurized fluid 1260, such as hot water, flowing through a first fluid flow pathway 1061, which includes the static fluid flow pathway 1060 and first fluid flow pathway 1061. The selected entry opening 1131 and a corresponding exit opening 1141 define at least a portion of the first fluid flow pathway 1061. The pressure 1044 of the fluid induces the downstream sealing surface 1214 of the seal member 1200 toward the upstream sealing surface 1106 of the upstream faceplate member 1040 to cause a fluid-tight seal to be formed between the downstream sealing surface 1214 and the upstream sealing surface 1106. In various embodiments, there is also an interference fit 1252, such as approximately 30/1000th of an inch between the downstream sealing surface 1214 and the upstream sealing surface 1106. As used herein, the term "approximately" signifies plus or minus 5/1000th of an inch. The interference fit 1252, if implemented, further enhances the fluid-tight seal between the downstream sealing surface 1214 in the upstream sealing surface 1106.

FIGS. 10A-10E

FIGS. 10A-10E comprise front views of the nozzle head 1006 of the hose nozzle 1000 with the faceplate 1100 positioned in different user-selectable rotational orientations 1161-1165. For example, when the faceplate 1100 is in a first user-selectable rotational orientation 1161, a first user-selectable spray pattern pathway 1151 (defined at least in part by the first exit opening 1141) comprises a portion of a first fluid flow pathway 1061; when the faceplate 1100 is in a second user-selectable rotational orientation 1162, a second user-selectable spray pattern pathway 1152 (defined at least in part by the second exit opening 1142) comprises a portion of a second fluid flow pathway 1062; when the faceplate 1100 is in a third user-selectable rotational orientation 1163, a third user-selectable spray pattern pathway 1153 (defined at least in part by the third exit opening 1143) comprises a portion of a third fluid flow pathway 1063; when the faceplate 1100 is in a fourth user-selectable rotational orientation 1164, a fourth user-selectable spray pattern pathway 1154 (defined at least in part by the fourth exit opening 1144) comprises a portion of a fourth fluid flow pathway 1064; and when the faceplate 1100 is in a fifth user-selectable rotational orientation 1165, a fifth user-selectable spray pattern pathway 1155 (defined at least in part by the fifth exit opening 1145) comprises a portion of a fifth fluid flow pathway 1065. As noted previously, in alternative embodiments, the hose nozzle 1000 may comprise fewer or more than five exit openings.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. For example, as noted previously, the number of exit openings and user-selectable spray pattern pathways may be varied within the scope of the disclosed subject matter. In addition, again by way of example, the hose nozzle may have an overall "pistol configuration" (as illustrated in the figures) or, alternatively, may have an overall linear configuration. Thus, the present disclosure is not intended to be limited to the aspects shown herein but is to be accorded the widest scope consistent with the principles and novel features disclosed.

The invention claimed is:

1. A hose nozzle for spraying fluids, the hose nozzle comprising:

a handle;

a body;

a nozzle head;

a fluid flow pathway extending through the handle, body and nozzle head, the nozzle head comprising:

a faceplate comprising a central pivot axis and an upstream faceplate face, the upstream faceplate face comprising an upstream sealing surface and defining two or more entry openings, wherein the faceplate is rotatable about the central pivot axis to two or more user-selectable rotational orientations, the two or more entry openings are disposed around the central pivot axis such that an intervening portion of the upstream sealing surface is disposed intermediate each of the two or more entry openings; and a seal member defining a seal opening that comprises a portion of the fluid flow pathway, wherein the faceplate is rotatable to the two or more user-selectable rotational orientations such that the seal opening is in fluid communication with a selected entry opening and a corresponding user-selectable spray pattern pathway, the corresponding user-selectable spray pattern pathway comprising a portion of the fluid flow pathway;

the seal member having an arcuate shape, the seal member comprising a first wing member and a second wing member extending away from the seal opening, the seal member having a downstream seal face and an upstream seal face, the downstream seal face comprising a downstream sealing surface, wherein the seal member is devoid of indirect and direct contact with a spring such that no spring induces movement of the seal member.

2. The hose nozzle of claim 1, wherein the downstream sealing surface has an interference fit of at least 30/1000th of an inch with the upstream sealing surface.

3. The hose nozzle of claim 1, wherein when a fluid is flowing through the fluid flow pathway, the fluid applies pressure to the upstream seal face to induce the downstream sealing surface of the seal member toward the upstream sealing surface of the faceplate such that a fluid-tight seal is formed between the downstream sealing surface and the upstream sealing surface to mitigate leakage of the fluid within the fluid flow pathway between the downstream sealing surface and the upstream sealing surface when the hose nozzle is in an operating state.

4. The hose nozzle of claim 1, wherein a ratio between a surface area of the upstream seal face to the surface area of an upstream entry point of the seal opening is at least 3.121 to 1.

5. The hose nozzle of claim 1, wherein the two or more entry openings comprise:

the selected entry opening;

an adjacent clockwise entry opening, situated immediately adjacent to the selected entry opening in a clockwise direction;

an adjacent counterclockwise entry opening, situated immediately adjacent to the selected entry opening in a counterclockwise direction, wherein a clockwise intervening portion of the downstream sealing surface is disposed intermediate the selected entry opening and the adjacent clockwise entry opening;

wherein a counterclockwise intervening portion of the downstream sealing surface is disposed intermediate the selected entry opening and the adjacent counterclockwise entry opening;

wherein the downstream sealing surface of the first wing engages with at least a portion of the clockwise intervening portion; and wherein the downstream sealing surface of the second wing engages with at least a portion of the counterclockwise intervening portion.

6. The hose nozzle of claim 1, wherein the faceplate comprises an upstream faceplate member comprising the two or more entry openings and a downstream faceplate member comprising two or more exit openings.

7. A hose nozzle for spraying fluids, the hose nozzle comprising:

a handle;

a body;

a nozzle head;

a fluid flow pathway extending through the handle, body and nozzle head, the nozzle head comprising:

a faceplate comprising a central pivot axis and an upstream faceplate face, the upstream faceplate face comprising an upstream sealing surface and defining two or more entry openings, wherein the faceplate is rotatable about the central pivot axis to two or more user-selectable rotational orientations, the two or more entry openings are disposed around the central pivot axis such that an intervening portion of the upstream sealing surface is disposed intermediate each of the two or more entry openings; and a seal member defining a seal opening that comprises a portion of the fluid flow pathway, wherein the faceplate is rotatable to the two or more user-selectable rotational orientations such that the seal opening is in fluid communication with a selected entry opening and a corresponding user-selectable spray pattern pathway, the corresponding user-selectable spray pattern pathway comprising a portion of the fluid flow pathway;

the seal member having an arcuate shape, the seal member comprising a first wing member and a second wing member extending away from the seal opening, the seal member having a downstream seal face and an upstream seal face, the downstream seal face comprising a downstream sealing surface, wherein the seal member is devoid of indirect and direct contact with a spring such that no spring induces movement of the seal member; and the downstream sealing surface being planar.

8. The hose nozzle of claim 7, wherein when a fluid is flowing through the fluid flow pathway, the fluid applies pressure to the upstream seal face to induce the downstream sealing surface of the seal member toward the upstream sealing surface of the faceplate such that a fluid-tight seal is formed between the downstream sealing surface and the upstream sealing surface to mitigate leakage of the fluid within the fluid flow pathway between the downstream sealing surface and the upstream sealing surface when the hose nozzle is in an operating state.

9. The hose nozzle of claim 7, wherein the downstream sealing surface has an interference fit of at least 30/1000th of an inch with the upstream sealing surface.

10. The hose nozzle of claim 7, wherein a ratio between a surface area of the upstream seal face to the surface area of an upstream entry point of the seal opening is at least 3.121 to 1.

11. The hose nozzle of claim 7, wherein the two or more entry openings comprise:

the selected entry opening;

an adjacent clockwise entry opening, situated immediately adjacent to the selected entry opening in a clockwise direction;

an adjacent counterclockwise entry opening, situated immediately adjacent to the selected entry opening in a counterclockwise direction, wherein a clockwise intervening portion of the downstream sealing surface is disposed intermediate the selected entry opening and the adjacent clockwise entry opening;

wherein a counterclockwise intervening portion of the downstream sealing surface is disposed intermediate the selected entry opening and the adjacent counterclockwise entry opening;

wherein the downstream sealing surface of the first wing engages with at least a portion of the clockwise intervening portion; and wherein the downstream sealing surface of the second wing engages with at least a portion of the counterclockwise intervening portion.

12. The hose nozzle of claim 7, wherein the faceplate comprises an upstream faceplate member comprising the two or more entry openings and a downstream faceplate member comprising two or more exit openings.

* * * * *